US009025005B2

(12) United States Patent
Yamaichi

(10) Patent No.: US 9,025,005 B2
(45) Date of Patent: May 5, 2015

(54) HOLOGRAPHIC IMAGING DEVICE AND METHOD

(75) Inventor: Eiji Yamaichi, Tokyo (JP)

(73) Assignee: Empire Technology Development LLC, Wilmington, DE (US)

( * ) Notice: Subject to any disclaimer, the term of this patent is extended or adjusted under 35 U.S.C. 154(b) by 18 days.

(21) Appl. No.: 13/989,792

(22) PCT Filed: May 30, 2012

(86) PCT No.: PCT/US2012/039907
§ 371 (c)(1),
(2), (4) Date: May 25, 2013

(87) PCT Pub. No.: WO2013/180693
PCT Pub. Date: Dec. 5, 2013

(65) Prior Publication Data
US 2014/0111609 A1    Apr. 24, 2014

(51) Int. Cl.
*G03H 1/00* (2006.01)
*G03H 1/22* (2006.01)
*G03H 1/02* (2006.01)

(52) U.S. Cl.
CPC ........... *G03H 1/2294* (2013.01); *G03H 1/0272* (2013.01); *G03H 1/02* (2013.01); *G03H 1/0248* (2013.01); *G03H 2001/0224* (2013.01); *G03H 2001/0268* (2013.01); *G03H 2001/2231* (2013.01); *G03H 2222/36* (2013.01); *G03H 2225/13* (2013.01); *G03H 2225/25* (2013.01); *G03H 2225/32* (2013.01); *G03H 2260/54* (2013.01)

(58) Field of Classification Search
USPC ................... 348/42–60; 359/32, 35; 369/53.2
See application file for complete search history.

(56) References Cited

U.S. PATENT DOCUMENTS 5,515,183 A * 5/1996 Hashimoto ...................... 359/32
7,835,050 B2    11/2010 Tanijiri et al.
(Continued)

FOREIGN PATENT DOCUMENTS

EP    1975675 A1 * 10/2008 ............... G03H 1/22
JP    2000232661 A * 8/2000 ............. H04N 13/04

OTHER PUBLICATIONS

"Photorefractive Effect", Wikipedia, [online]. [retrieved on Apr. 25, 2013]. Retrieved from the Internet at <URL: http://en.wikipedia.org/wiki/Photorefractive_effect>.
(Continued)

*Primary Examiner* — Dave Czeka
*Assistant Examiner* — Shanika Brumfield
(74) *Attorney, Agent, or Firm* — Ren-Sheng International

(57) ABSTRACT

Technologies are generally described for reproducing holographic images by causing a photo-induced change in the diffractive index of a holographic recording medium. An example device may include a light irradiation unit and a transparent substrate. The light irradiation unit can be configured to transmit a photo-inducing light. Further, the transparent substrate may have a predetermined refractive index and can be configured to include a first surface and a second surface opposite the first surface. The first surface can be configured to receive an incident light, and the second surface can be configured to receive the photo-inducing light. The transparent substrate can be configured to form interference fringe patterns from a photo-induced change in the refractive index of the transparent substrate responsive to the photo-induced light.

26 Claims, 9 Drawing Sheets

(56) References Cited

U.S. PATENT DOCUMENTS

2004/0161196 A1 8/2004 Murashima et al.
2005/0208388 A1 9/2005 Furuki et al.
2006/0044639 A1* 3/2006 Misawa et al. .................. 359/35
2009/0245052 A1* 10/2009 Usami .......................... 369/53.2

OTHER PUBLICATIONS

"Real-Time Holographic Videos Based on Photorefractive Polymers", available at <URL: http://www.youtube.com/watch?v=7RuHEliwJnA>, uploaded on Nov. 3, 2010.

Canek Fuentes-Hernandez et al., "Video-rate Compatible Photorefractive Polymers with Stable Dynamic Properties under Continuous Operation", Applied Physics Letters, Sep. 13, 2004, vol. 85, No. 11, American Institute of Physics.

M. Eralp et al., "Photorefractive Polymer Device with Video-rate Response Time Operating at Low Voltages", Optics Letters, May 15, 2006, pp. 1408-1410, vol. 31, No. 10.

Notification of Transmittal of the International Search Report and the Written Opinion of the International Searching Authority, PCT/US2012/039907, Jan. 31, 2013.

* cited by examiner

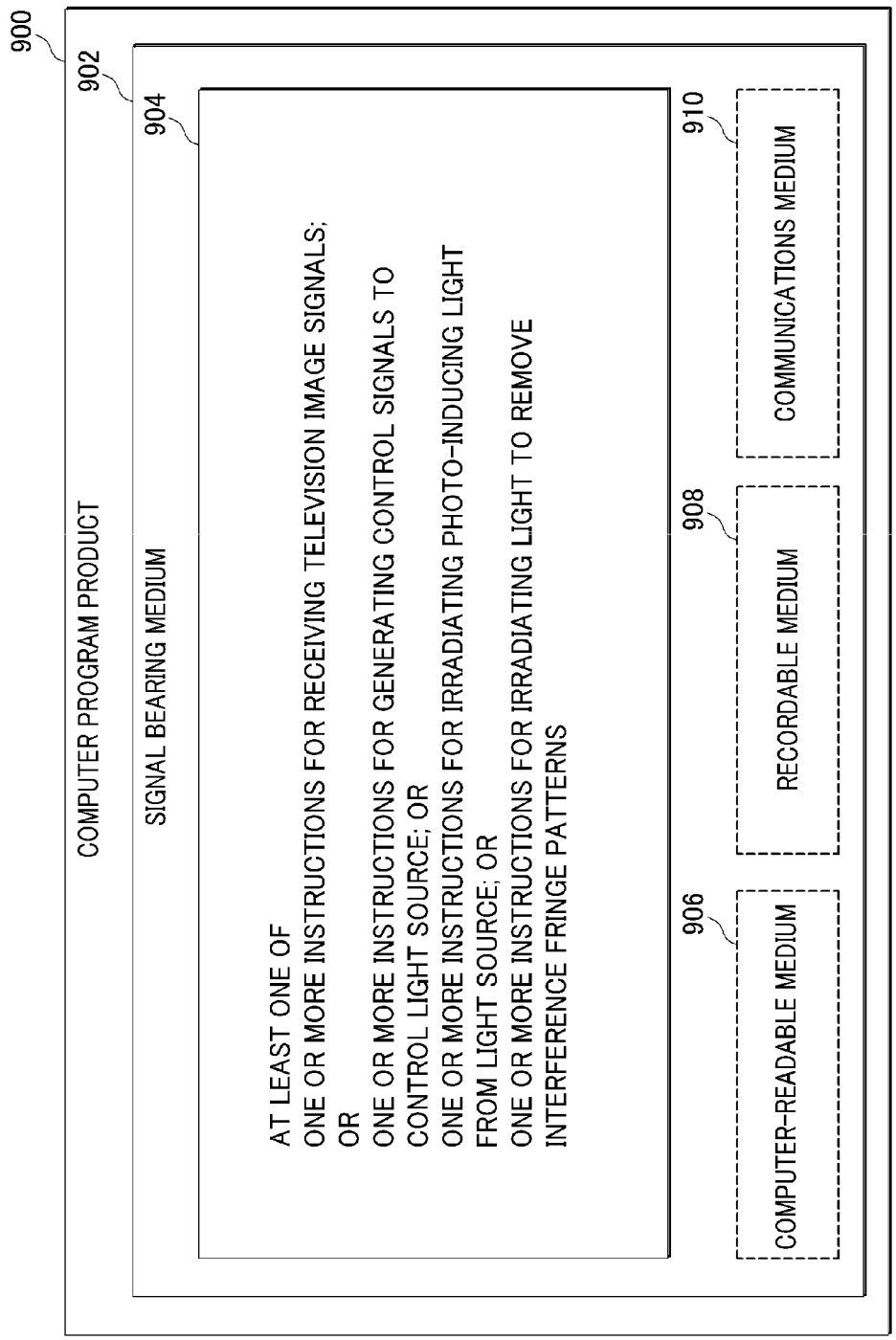

HOLOGRAPHIC IMAGING DEVICE AND METHOD

CROSS-REFERENCE TO RELATED APPLICATIONS

The present application is a 35 USC §371 application of International Application PCT/US2012/039907, filed on May 30, 2012 and entitled "HOLOGRAPHIC IMAGING DEVICE AND METHOD." The International Application, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

Transmission-type holography techniques can be used to reproduce two-dimensional and three-dimensional images in a holographic television system. In such a holography television system, a hologram can be displayed on a high-definition liquid crystal display panel constituted of pixels having a resolution of the order of the optical diffraction limit The hologram may be formed based on fringe patterns contained in television image signals that can be transmitted through a television broadcast channel. In particular, the hologram can be formed using a reconstruction light (e.g., from a laser light source) that is irradiated from one side of the display panel on the fringe patterns displayed and arranged vertically with respect to the plane of the display panel. The irradiation of the reconstruction light on the fringe patterns causes diffraction in the fringe patterns, such that a user can observe the diffracted light as holographic images emitted from the other side of the display panel.

However, conventional transmission-type holography television systems may not be able to reproduce images in a realistic setting because the images are reproduced by the diffracted light emitted from the opposite side to the side of display panel on which the reconstruction light is incident. On the other hand, a human being can recognize a three-dimensional object by observing light reflected on the object, which is contrary to the above described conventional principles of transmission-type holography. Further, images reproduced in the transmission-type holography television system have a lower luminance compared to that of the display panel, which may deteriorate the visibility and distinction of the images viewed by the user. Furthermore, because a monochromic light such as laser light is typically used as the reconstruction light, the images may not be properly reproduced in color.

To resolve the above problems of the transmission-type holography, reflection-type holography techniques can be used in implementing a holography television system. In a reflection-type holography television system, hologram images can be formed based on multiple layers of fringe patterns displayed and arranged horizontally with respect to the plane of the display panel. A reconstruction light can be irradiated on the fringe patterns, which results in diffraction in the fringe patterns. In particular, in Lippmann holography, when a reconstruction light is irradiated on the fringe patterns, three-dimensional images can be reproduced through Bragg reflection. Bragg reflection refers to a phenomenon where light with particular wavelengths can be selectively reflected in response to the space between the fringe patterns and the orientation thereof, whereas light with the other wavelengths can be transmitted or absorbed into the recording medium in the display panel.

With the above-described characteristics, Lippmann holography may have various advantages including the capability of reproducing color images using white-color light. Also, Lippmann holography can provide clearer and brighter hologram images compared to conventional transmission-type holography because Lippmann holography has higher light diffraction efficiency. Further, since the hologram images can be reproduced by the reconstruction light selectively reflected on the fringe patterns, the user can observe the images as if the reproduced images are seen from a real world environment.

One example Lippmann holography television system may include a display panel with a transparent substrate including a two-dimensional matrix of small-sized optical elements and a controller that can individually provide control signals to the optical elements. When control signals are provided to the optical elements, the refractive index of the optical elements can change, which can cause a difference between the refractive indexes of the optical elements and the transparent substrate. In this configuration, wires are required to connect the controller to the optical elements in order to prevent leakage of the control signals. Such wiring may limit the reduction in the thickness of the display panel and also may interfere with the hologram images emitted from the optical elements. Another potential problem is that gaps between the optical elements may make it difficult to form continuous fringe patterns in the display panel.

SUMMARY

Technologies are generally described for reproducing holographic images by causing a change in the diffractive index of a recording medium using photo-inducing light.

Various example apparatus described herein may include a light irradiation unit and a transparent substrate. The light irradiation unit can be configured to transmit a photo-inducing light. The transparent substrate may have a predetermined refractive index, where the transparent substrate may include a first surface and a second surface opposite the first surface. The first surface can be configured to receive an incident light, and the second surface can be configured to receive the photo-inducing light. The transparent substrate can be configured to form interference fringe patterns from a photo-induced change in the refractive index of the transparent substrate responsive to the photo-induced light. The light irradiation unit may include at least one laser beam source, which can be configured to irradiate the second surface of the transparent substrate with two laser beams crossing with each other at a predetermined location in the transparent substrate, effective to cause the photo-induced change in the refractive index of the transparent substrate. The device may further include an erasing light irradiation unit configured to irradiate the second surface of the transparent substrate with a light, effective to remove the interference fringe patterns formed in the transparent substrate. Some examples may include a controller that is configured to control the light irradiation unit and determine at least one of an angle and a position of the interference fringe patterns formed in the transparent substrate.

In some examples, holographic television devices are described, which may include a plurality of holographic imaging devices arranged in a two-dimensional matrix form. Each holographic imaging device can include a transparent substrate and a light irradiation unit configured to transmit a photo-inducing light. The transparent substrate may have a predetermined refractive index, where the transparent substrate may include a first surface and a second surface opposite the first surface. The first surface can be configured to receive an incident light, and the second surface can be configured to receive the photo-inducing light. The transparent substrate can be configured to form interference fringe patterns from a photo-induced change in the refractive index of the transparent substrate responsive to the photo-induced light. Some further examples may include a controller that is configured to control the light irradiation unit and determine at least one of an angle and a position of the interference fringe patterns formed in the transparent substrate. Some additional examples may include a receiving unit that is configured to receive a control signal from an external source and provide the control signal to the controller.

In some examples, methods for generating an image are described, where the methods may be performed by one or more of the holographic imaging devices described herein. The example methods may include irradiating, by a light irradiation unit, the second surface of the transparent substrate with a photo-inducing light to form interference fringe patterns by causing a photo-induced change in the refractive index of a transparent substrate in the holographic imaging device.

In some examples, computer-readable storage mediums are described that may be adapted to store a program operable by a holographic imaging device to configure the holographic imaging device to carry out holographic image generation. The holographic imaging device may include various features as further described herein. The program may include one or more instructions for irradiating, by a light irradiation unit, the second surface of the transparent substrate with a photo-inducing light to form interference fringe patterns by causing a photo-induced change in the refractive index of the transparent substrate.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 9 illustrates computer program products that can be utilized to reproduce holographic images in a holographic imaging device, all arranged in accordance with at least some embodiments described herein.

DETAILED DESCRIPTION

Figure 1:
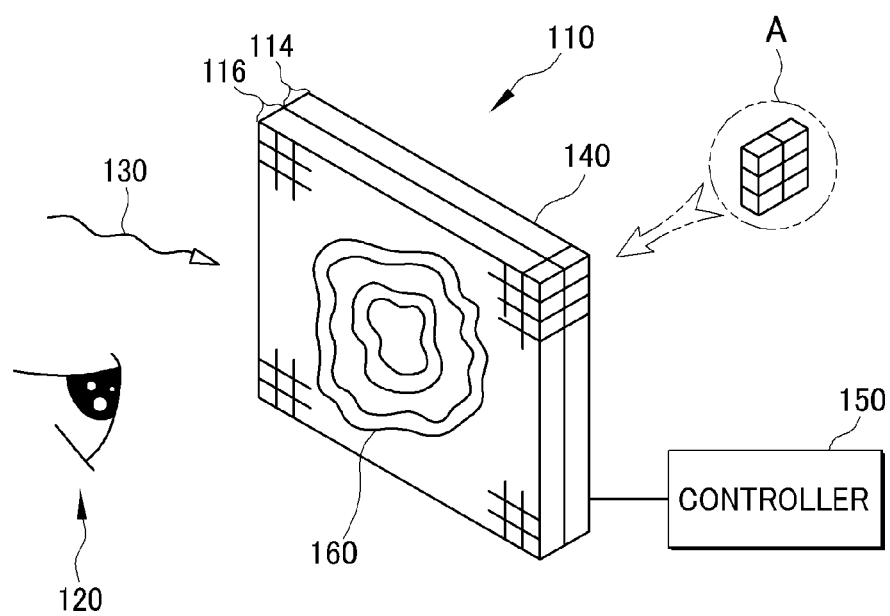
FIG. 1 schematically shows an illustrative example holographic television apparatus.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to reproducing holographic images by causing a change in the diffractive index of a medium using photo-inducing light.

Briefly stated, technologies are generally described for reproducing holographic images using photo-inducing light, which may be utilized in a holographic imaging devices or a television apparatus configured to display three-dimensional holographic images. Example holographic imaging devices may be configured to irradiate a photo-inducing light on one side of a transparent substrate, such that interference fringe patterns are formed from a photo-induced change in the refractive index of the transparent substrate. Incident light may be received on the other side of the transparent substrate and reflected in the interference fringe patterns formed within the transparent substrate.

In some embodiments, at least one laser beam source may be configured to irradiate a photo-inducing light on a transparent substrate such that two laser beams cross each other at a predetermined location of the transparent substrate, and a photo-induced change in the refractive index of the transparent substrate occurs. Further, another laser beam source may be configured to irradiate an erasing light on the transparent substrate effective to remove the interference fringe patterns formed in the transparent substrate. In some embodiments, a controller may be configured to control the laser beam source (or sources) effective to select at least one of an angle and/or a position of the interference fringe patterns formed in the transparent substrate.

FIG. 1 schematically shows an illustrative example holographic television apparatus 110 configured to reproduce holographic images using a photo-inducing light, in accordance with at least some embodiments described herein.

As depicted, holographic television apparatus 110 may include a display panel 140, and a controller 150 coupled to display panel 140. Display panel 140 may include a two-dimensional matrix of holographic imaging devices (for example, A in FIG. 1 indicating a row of holographic imaging devices in the matrix), each of which may be configured to generate at least a part of interference fringe patterns 160 by irradiating photo-inducing light 115 (see FIG. 2) to a transparent substrate 116 in the display panel 140. Controller 150 may be configured to receive television image signals and generate control signals based on the received television image signals. The control signals may be provided to corresponding holographic imaging devices to control the generation and irradiation of photo-inducing light 115.

In the meantime, incident light 130 (e.g., ambient light) may be incident on a front side of display panel 140, which faces user 120 of holographic television system 110. When incident light 130 is irradiated on interference fringe patterns 160, three-dimensional images are reproduced through Bragg reflection. Specifically, light with particular wavelengths may be selectively reflected depending on the gap between interference fringe patterns 160 and the orientation thereof, whereas light with the other wavelengths may be transmitted or absorbed into the transparent substrate of display panel 140.

Figure 2:
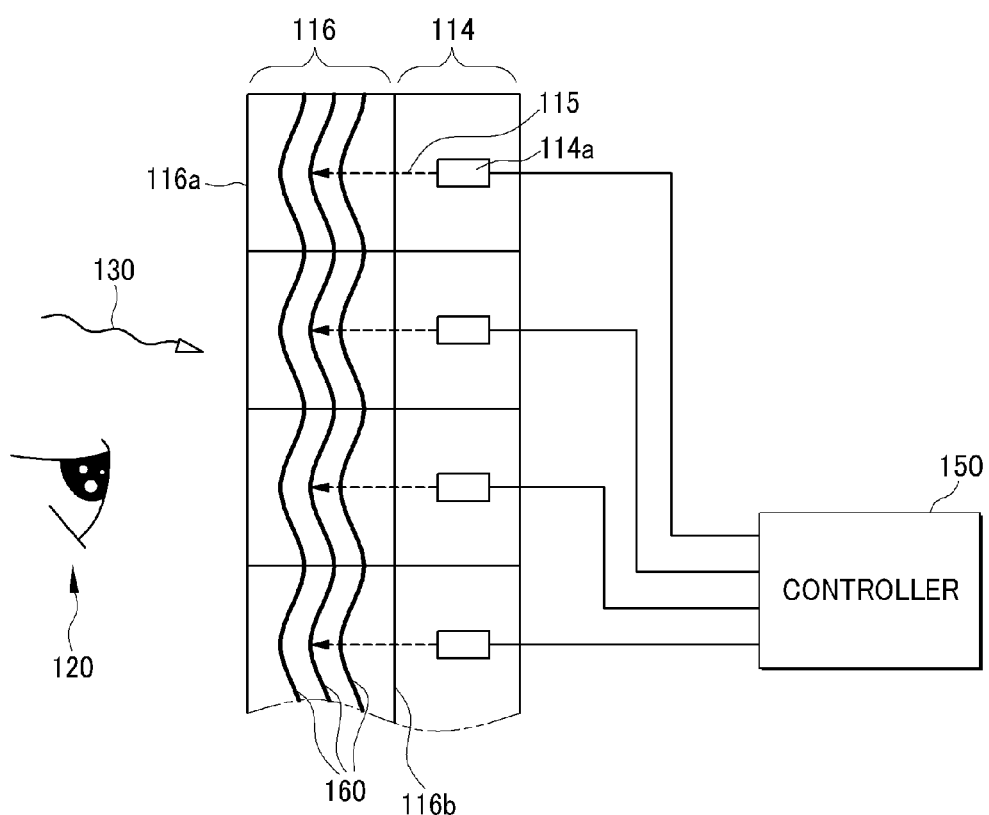
FIG. 2 schematically shows an array of illustrative example holographic imaging devices according to one embodiment.

FIG. 2 schematically shows a cross sectional view of an array of holographic imaging devices A in display panel 140, as indicated in FIG. 1, in accordance with at least some embodiments described herein.

As shown, each of the holographic imaging devices may include a transparent substrate 116 and a light irradiation unit 114. Transparent substrate 116 may include an incident surface 116a on which incident light 130 may be made incident and may be observed by user 120. Light irradiation unit 114 may include at least one light source 114a that can be configured to irradiate photo-inducing light 115 towards transparent substrate 116 effective to form interference fringe patterns 160 by causing a photo-induced change in the refractive index of transparent substrate 116. In some embodiments, light irradiation unit 114 may include at least one infrared laser light source. Further, light irradiation unit 114 can be configured to irradiate photo-inducing light 115 with energy level that is greater than the energy gap between a conduction band and a valence band of the transparent substrate 116, which will be described later with reference to FIGS. 3A and 3B. Also, photo-inducing light 115 generated by light irradiation unit 114 may have a light intensity that is sufficiently greater than a light intensity required for causing two-photon absorption in transparent substrate 116.

Each light irradiation unit 114 may be provided with a control signal from controller 150. Responsive to the control signal, light irradiation unit 114 may be configured to adjust the orientation of photo-inducing light 115 emitted from light source 114a. Controller 150 may be disposed at a certain position in holographic television apparatus 110 such that controller 150 and its connection to light irradiation unit 114 may not interfere with light irradiated and reflected from transparent substrate 116. In some embodiments, light irradiation unit 114 may include at least two light sources and/or an erasing light source (not shown), which will be described later.

In some embodiments, transparent substrate 116 may be made of any suitable transparent ferroelectric material including, but not limited to, LiNbO$_3$, BaTiO$_3$, KDP (Kalium Dihydrogen Phosphate), and ZnO, in which Fe or an impurity for forming a trap level is added. Further, transparent substrate 116 may have a sufficient thickness such that the transparent substrate 116 is operable as a Lippmann hologram recording medium, more specifically a thickness of the order of about 10 μm. Before irradiation with photo-inducing light 115, transparent substrate 116 may have a refractive index n with respect to incident light 130. However, upon irradiation with photo-inducing light 115, a photo-induced change in the refractive index can occur, causing a difference in refractive index Δn between a photo-induced region and non-irradiated region in transparent substrate 116.

Figure 3A:
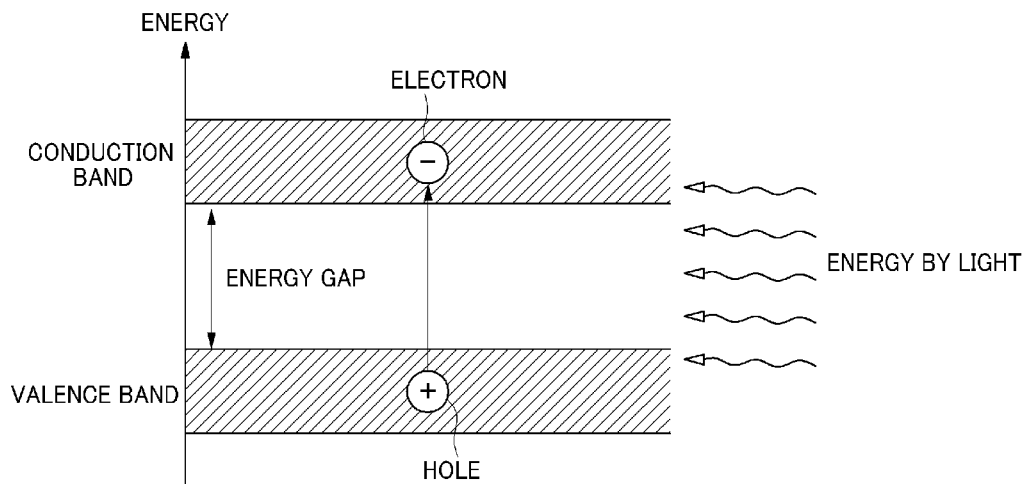
FIGS. 3A and 3B illustrate an electronic band structure of a transparent substrate in an illustrative example holographic imaging device.
Figure 3B:
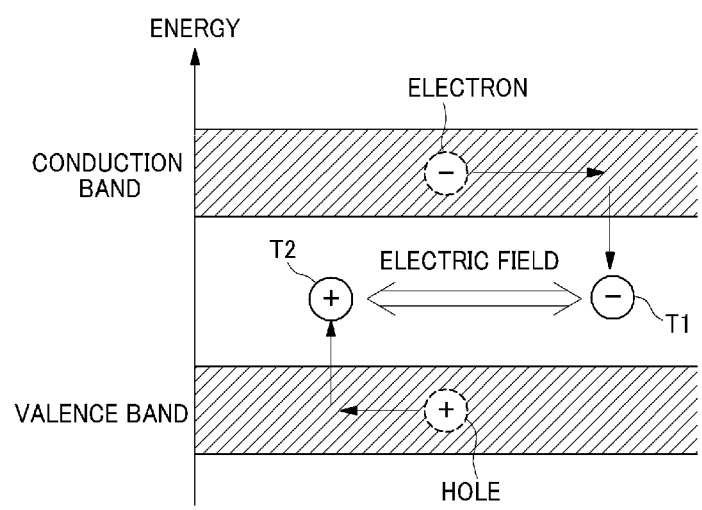

The following is a description how the irradiation of photo-inducing light 115 on transparent substrate 116 may cause a photo-induced change in the refractive index. FIGS. 3A and 3B show an example energy band structure of a transparent substrate in an illustrative example holographic imaging device. Before photo-inducing light 115 is irradiated on transparent substrate 116, neither an electron nor a hole is trapped in its trap level (i.e., a certain level in the energy gap between a conduction band and a valence band). In this state, the refractive index of transparent substrate 116 remains n. Upon irradiation with photo-inducing light 115, as shown in FIG. 3A, two-photon absorption occurs in the photo-induced region in transparent substrate 116, exciting an electron sufficient to jump across the energy gap from the valence band to the conduction band.

Further, as shown in FIG. 3B, the electron excited to the conduction band is transferred via the internal electric field of the ferroelectric material in transparent substrate 116. The electron can then be trapped at its trap level T1. Meanwhile, the hole generated in the valence band is transferred in the opposite direction to the electron via the internal electric field and trapped at its trap level T2. Thus, as shown in FIG. 3B, an electric field is generated between the electron and the hole trapped its trap levels T1 and T2. The electric field thus generated causes an electro-optical effect, which refers to a change in the optical properties such as the refractive index of the ferroelectric material in transparent substrate 116 in response to the electric field.

Referring back to FIG. 2, when light irradiation unit 114 is controlled to irradiate photo-inducing light 115 selectively and sequentially on respective layers (or regions) 160 located at certain periodic intervals with respect to the irradiation direction of incident light 130, the photo-induced change Δn occurs substantially in selected regions 160. Thus, a refractive index distribution with the spatial periodicity is generated in transparent substrate 116. When incident light 130 enters transparent substrate 116 with the above refractive index distribution, interference fringe patterns are formed in transparent substrate 116. In this state, incident light 130 having wavelengths satisfying the Bragg condition is reflected in the interference fringe patterns, while light having the other wavelengths is transmitted through transparent substrate 116.

As described above, by causing a photo-induced change in the refractive indexes of certain layers of transparent substrate 116, the interference fringe patterns can be formed in transparent substrate 116 in the form of a number of layers substantially parallel to incident surface 116a. Further, by controlling the light irradiation unit 114 by controller 150, the layer intervals, positions and/or orientation of the interference fringe patterns can be controlled. In this manner, holographic images can be reproduced in the holographic imaging devices by reflecting light having a certain wavelength in a certain direction in a plane parallel to the plane of transparent substrate 116.

Figure 4:
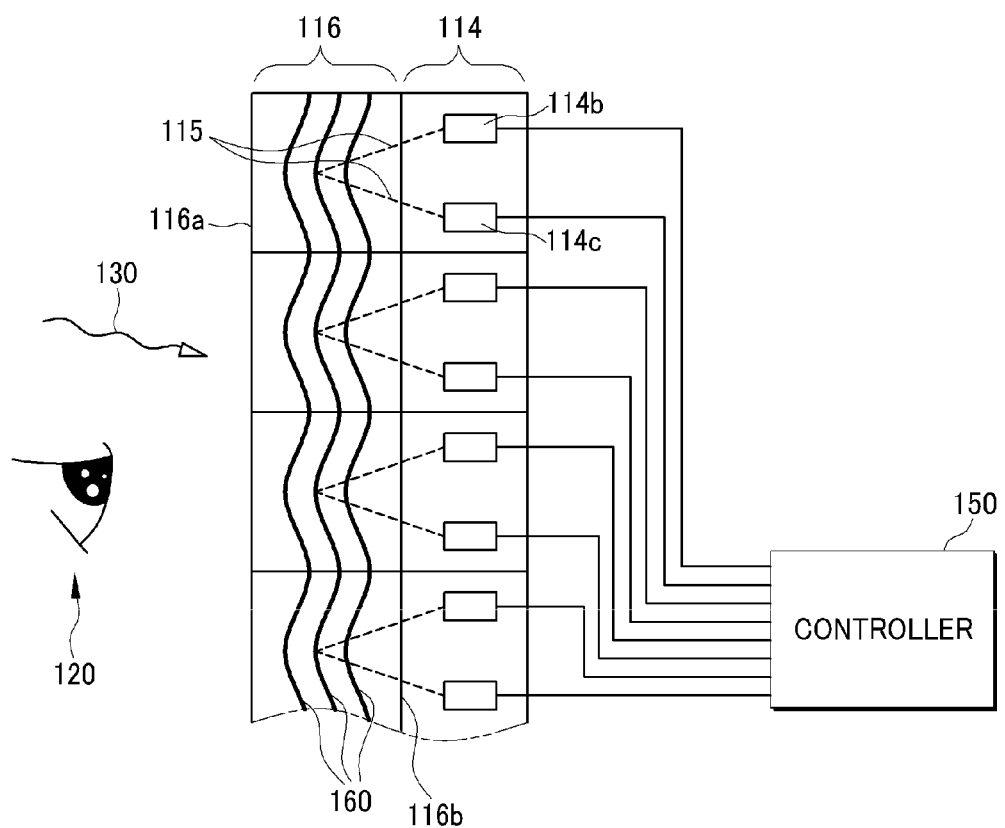
FIG. 4 schematically shows an array of illustrative example holographic imaging devices according to another embodiment.

FIG. 4 schematically shows a cross sectional view of an array of holographic imaging devices, each of which may have two or more photo-inducing light sources, in accordance with at least some embodiments described herein. Similar to the holographic image devices as shown in FIG. 2, the array of holographic imaging devices shown in FIG. 4 can be implemented in display panel 140 (e.g., portion A as indicated in FIG. 1). In FIG. 4, similar elements to those shown in FIG. 2 are indicated with similar reference numerals, and thus a description thereof will be omitted for the sake of simplicity.

As shown, each of the holographic imaging devices may include transparent substrate 116 and light irradiation unit 114. Light irradiation unit 114 may include two or more light sources 114b and 114c, each of which can be configured to irradiate photo-inducing light 115 towards transparent substrate 116. In some embodiments, each of light sources 114b and 114c can be configured to irradiate photo-inducing light 115 such that the two lights emitted from light sources 114b and 114c can cross at a certain layer 160 in transparent substrate 116, thereby causing a photo-induced change in the refractive index of transparent substrate 116.

In some embodiments, each of light sources 114b and 114c may be, but not limited to, an infrared laser light source. Further, assuming that the energy level of photo-inducing light 115 emitted from each of the two light sources is E, light sources 114b and 114c can be configured to irradiate respective photo-inducing lights 115 such that a combined energy level of 2E results, which is greater than the energy gap between a conduction band and a valence band of the transparent substrate 116. Also, photo-inducing light 115 generated by light irradiation unit 114 may have a light intensity that is greater than a light intensity required for causing two-photon absorption in transparent substrate 116.

Each of light sources 114b and 114c may be provided with a control signal from controller 150. Based on the control signal, each of light sources 114b and 114c may be configured to adjust the orientation of photo-inducing light 115 emitted therefrom.

Figure 5:
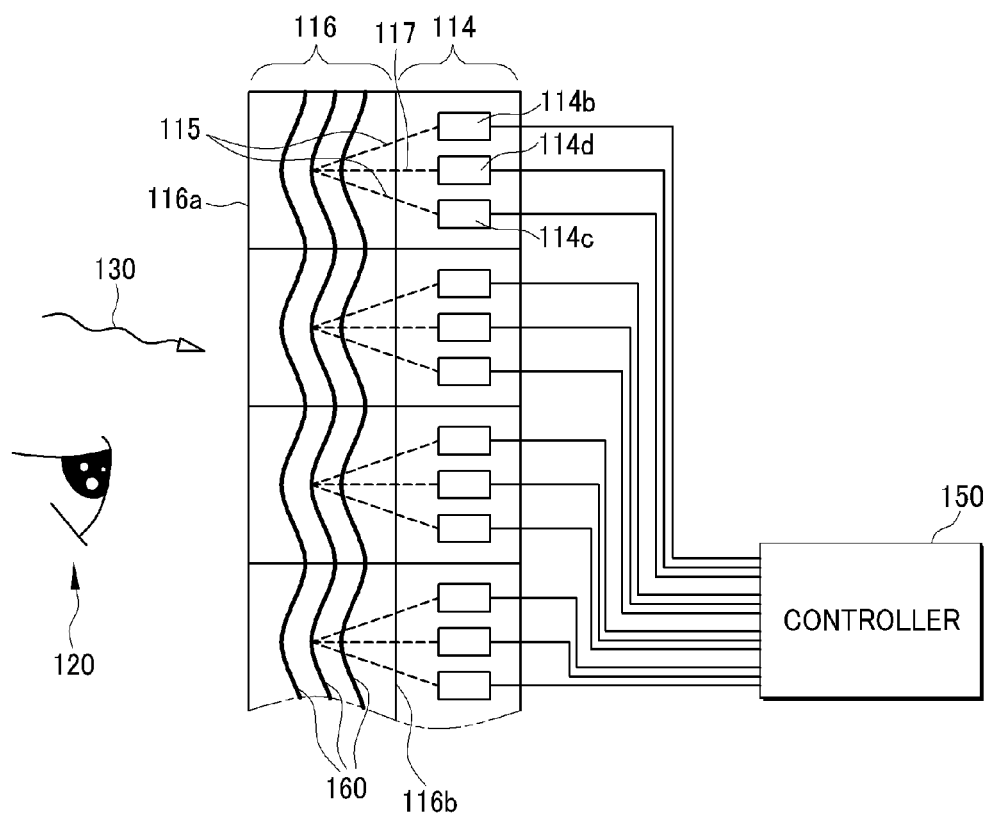
FIG. 5 schematically shows an array of illustrative example holographic imaging devices according to yet another embodiment.

FIG. 5 schematically shows a cross sectional view of an array of holographic imaging devices, each of which has at least two photo-inducing light sources and at least one erasing light source, in accordance with at least some embodiments described herein. Similar to the holographic image devices as shown in FIG. 2, the array of holographic imaging devices shown in FIG. 5 can be implemented in display panel 140 (e.g., portion A as indicated in FIG. 1). In FIG. 5, similar elements to those shown in FIGS. 2 and 4 are indicated with similar reference numerals, and thus a description thereof will be omitted for the sake of simplicity.

As shown, each of the holographic imaging devices may include transparent substrate 116 and light irradiation unit 114. Light irradiation unit 114 may include at least two light sources 114b and 114c, each of which can be configured to irradiate photo-inducing light 115 towards transparent substrate 116, and at least one erasing light source 114d. In some embodiments, each of light sources 114b and 114c can be configured to irradiate photo-inducing light 115 such that the two lights emitted from light sources 114b and 114c cross at a certain layer 160 in transparent substrate 116, thereby causing a photo-induced change in the refractive index of transparent substrate 116.

Further, erasing light source 114d can be configured to irradiate erasing light 117 towards the regions where the photo-induced changes in the refractive index has occurred, thereby removing the interference fringe patterns formed in transparent substrate 116. In particular, the irradiation of erasing light 117 onto transparent substrate 116 release the holes and electrons from its trap levels (T1 and T2 as shown in FIG. 3B) and thus may reset the refractive index in the photo-induced regions to the original refractive index n.

Each of light sources 114b, 114c and 114d may be provided with a control signal from controller 150. Based on the control signal, each of light sources 114b, 114c and 114d may be configured to adjust the orientation of photo-inducing light 115 or erasing light 117 emitted therefrom.

Figure 6:
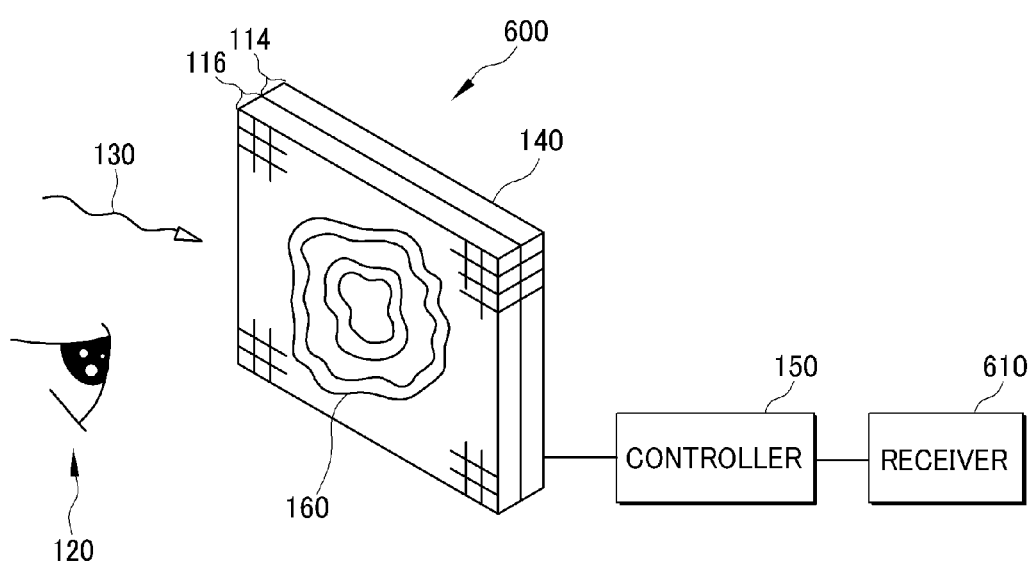
FIG. 6 schematically shows an illustrative example holographic television apparatus including a receiving unit.

FIG. 6 schematically shows another illustrative example holographic television apparatus 600 configured to reproduce holographic images using a photo-inducing light in accordance with at least some embodiments described herein. Holographic television apparatus 600 has a similar configuration to holographic television apparatus 110 in FIG. 1 except that holographic television apparatus 600 further includes receiver 610. In FIG. 6, similar elements to those shown in FIG. 1 are indicated with similar reference numerals, and thus a description thereof will be omitted for the sake of simplicity.

As depicted, holographic television apparatus 600 may include display panel 140, controller 150 and receiver 610. Display panel 140 may include a two-dimensional matrix of holographic imaging devices, each of which may be configured to generate at least a part of interference fringe patterns 160 by irradiating photo-inducing light 115 (see FIG. 2) to transparent substrate 116 in the display panel 140. Controller 150 may be configured to receive television image signals from receiver 610. The television image signals may be encoded with any suitable encoding techniques into particular formats including, but not limited to, NTSC/PAL analog signals, RGB, 4fSC composite digital signals or 4:2:2 component signals. Control signals may be then extracted from the television image signals and provided to corresponding holographic imaging devices to control the generation and irradiation of photo-inducing light 115.

In some embodiments, receiver 610 can be configured to receive television image signals through a network (not shown). For example, the network may be any suitable television broadcasting network including, but not limited to, a cable broadcasting network, a terrestrial broadcasting network and a satellite broadcasting network. In some embodiments, receiver 610 may receive television image signals that are compressed or scrambled using any suitable image encoding/compression techniques. In such case, receive 610 can be further configured to decompress or descramble the compressed signals to reconstruct the original television image signals.

Figure 7:
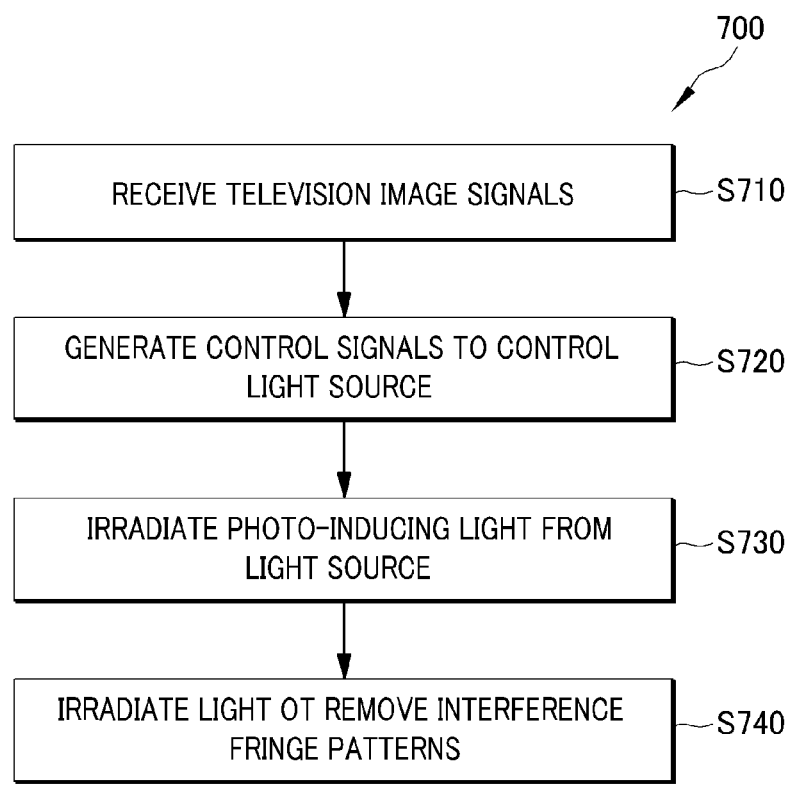
FIG. 7 shows an example flowchart of a method adapted to reproduce holographic images in a holographic imaging device.

FIG. 7 shows an example flow diagram of a method adapted to reproduce holographic images in a holographic television apparatus arranged in accordance with at least some embodiments described herein. An example method 700 in FIG. 7 may be implemented using, for example, a computing device including a processor adapted to control a holographic television apparatus to reproduce holographic images.

Method 700 may include one or more operations, actions, or functions as illustrated by one or more of blocks S710, S720, S730 and/or S740. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 700 may begin at block S710.

At block S710, television image signals may be received. In particular, the television image signals may be received by receiver 610 of holographic television apparatus 600 as shown in FIG. 6. In some embodiments, in case the television image signals are received in a compressed form, receiver 610 may decompress the signals to reconstruct the original television image signals and transmit the reconstructed signals to controller 150 for further processing. Block S710 may be followed by block S720.

At block S720, control signals may be generated to control at least one light source. In particular, the control signals may be generated by controller 150 based on the television image signals. The control signals may be provided to light irradiation unit 114 to control at least one light source in light irradiation unit 114. Block S720 may be followed by block S730.

At block S730, a photo-inducing light may be irradiated from a light source. In particular, photo-inducing light 115 may be irradiated from at least one light source in light irradiation unit 114 toward transparent substrate 116, thereby causing a photo-induced change in the diffractive index of transparent substrate 116. Such photo-induced change in the diffractive index may cause interference fringe patterns to be formed in transparent substrate 116. In some embodiments, the orientation and angle of the photo-inducing light emitted from the light source can be controlled based on the control signals. In this way, photo-induced changes in the refractive index of transparent substrate 116 can be controlled in the form of multiple layers parallel to the plane of transparent substrate 116. Also, the intervals between such layers can be individually controlled. Block S730 may be followed by block S740.

At block S740, a light may be irradiated to remove interference fringe patterns. In particular, a light 117 may be irradiated from light irradiation unit 114 toward the interference fringe patterns formed in transparent substrate 116, thereby resetting the diffractive index in the photo-induced regions to the original diffractive index.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
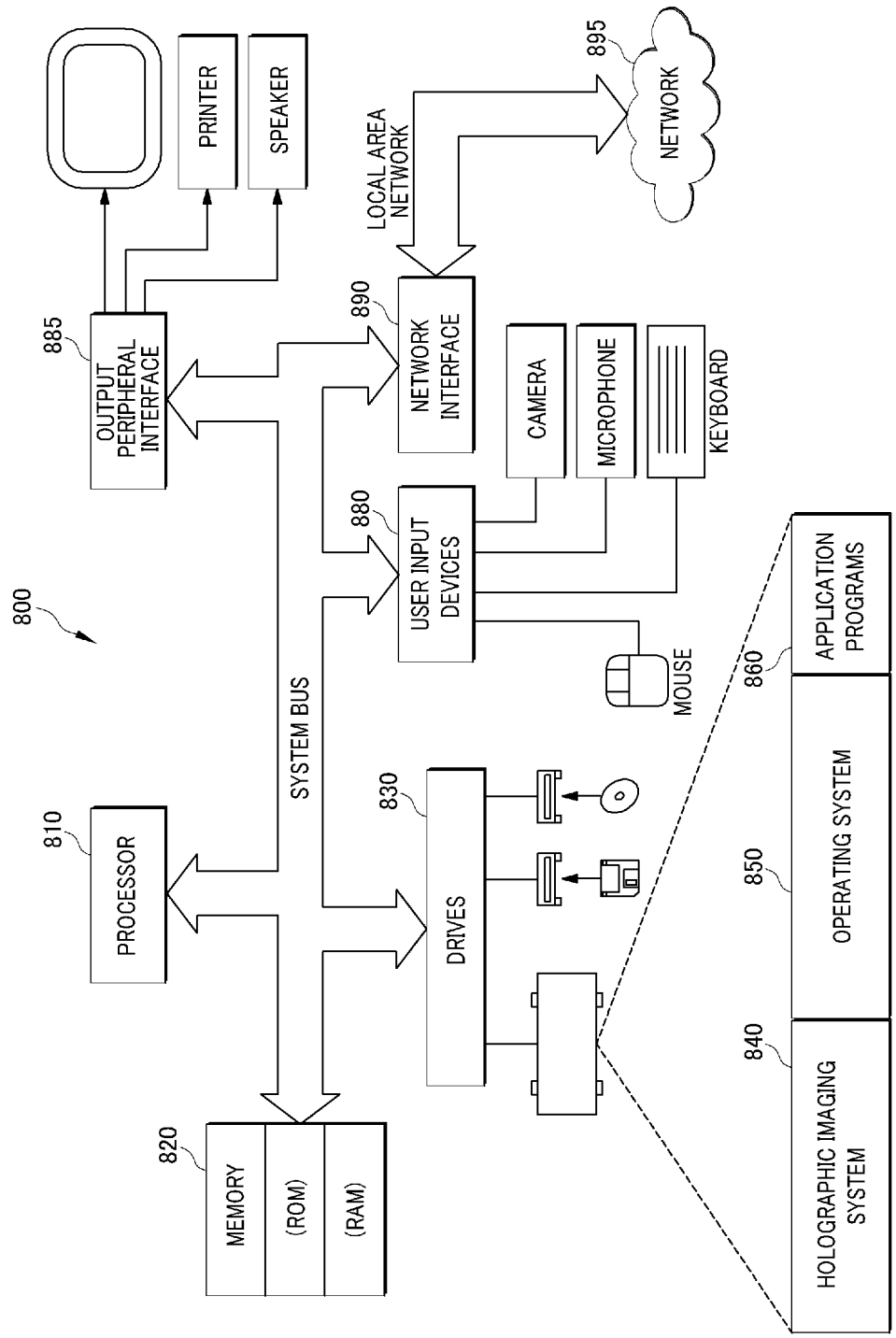
FIG. 8 shows a schematic block diagram illustrating an example computing system that can be configured to perform a method for reproducing holographic images in a holographic imaging device.

FIG. 8 shows a schematic block diagram illustrating an example computing system that can be configured to operate a holographic television apparatus arranged in accordance with at least some embodiments described herein. As depicted in FIG. 8, a computer 800 may include a processor 810, a memory 820 and one or more drives 830. Computer 800 may be implemented as a conventional computer system, an embedded control computer, a laptop, or a server computer, a mobile device, a set-top box, a kiosk, a vehicular information system, a mobile telephone, a customized machine, or other hardware platform.

Drives 830 and their associated computer storage media may provide storage of computer readable instructions, data structures, program modules and other data for computer 800. Drives 830 may include a holographic imaging system 840, an operating system (OS) 850, and application programs 860. Holographic imaging system 840 may be adapted to control the holographic television apparatus to reproduce holographic images using a photo-inducing light. Additionally, holographic imaging system 840 may be adapted to control the holographic television apparatus in such a manner as described above with respect to FIGS. 1 to 7.

Computer 800 may further include user input devices 880 through which a user may enter commands and data. Input devices can include an electronic digitizer, a camera, a microphone, a keyboard and pointing device, commonly referred to as a mouse, trackball or touch pad. Other input devices may include a joystick, game pad, satellite dish, scanner, or the like.

These and other input devices can be coupled to processor 810 through a user input interface that is coupled to a system bus, but may be coupled by other interface and bus structures, such as a parallel port, game port or a universal serial bus (USB). Computers such as computer 800 may also include other peripheral output devices such as display devices, which may be coupled through an output peripheral interface 885 or the like.

Computer 800 may operate in a networked environment using logical connections to one or more computers, such as a remote computer coupled to a network interface 890. The remote computer may be a personal computer, a server, a router, a network PC, a peer device or other common network node, and can include many or all of the elements described above relative to computer 800.

Networking environments are commonplace in offices, enterprise-wide area networks (WAN), local area networks (LAN), intranets, and the Internet. When used in a LAN or WLAN networking environment, computer 800 may be coupled to the LAN through network interface 890 or an adapter. When used in a WAN networking environment, computer 800 typically includes a modem or other means for establishing communications over the WAN, such as the Internet or a network 895. The WAN may include the Internet, the illustrated network 895, various other networks, or any combination thereof. It will be appreciated that other mechanisms of establishing a communications link, ring, mesh, bus, cloud, or network between the computers may be used.

In some embodiments, computer 800 may be coupled to a networking environment. Computer 800 may include one or more instances of a physical computer-readable storage medium or media associated with drives 830 or other storage devices. The system bus may enable processor 810 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 820, whether characterized as RAM, ROM, flash, or other types of volatile or nonvolatile memory technology. The media may also represent secondary storage, whether implemented as storage drives 830 or otherwise. Hard drive implementations may be characterized as solid state, or may include rotating media storing magnetically encoded information.

Processor 810 may be constructed from any number of transistors or other circuit elements, which may individually or collectively assume any number of states. More specifically, processor 810 may operate as a state machine or finite-state machine. Such a machine may be transformed to a second machine, or specific machine by loading executable instructions. These computer-executable instructions may transform processor 810 by specifying how processor 810 transitions between states, thereby transforming the transistors or other circuit elements constituting processor 810 from a first machine to a second machine. The states of either machine may also be transformed by receiving input from user input devices 880, network interface 890, other peripherals, other interfaces, or one or more users or other actors. Either machine may also transform states, or various physical characteristics of various output devices such as printers, speakers, video displays, or otherwise.

FIG. 9 illustrates computer program products 900 that can be utilized to operate a holographic television apparatus in accordance with at least some embodiments described herein.

Program product 900 may include a signal bearing medium 902. Signal bearing medium 902 may include one or more instructions 904 that, when executed by, for example, a processor, may provide the functionality described above with respect to FIGS. 1-8. By way of example, instructions 904 may include: one or more instructions for receiving television image signals; one or more instructions for generating control signals to control a light source; one or more instructions for irradiating a photo-inducing light from the light source; or one or more instructions for irradiating a light to remove interference fringe patterns. Thus, for example, referring to FIGS. 1 and 6, holographic television apparatus 110 or 600 may undertake one or more of the blocks shown in FIG. 7 in response to instructions 904.

In some implementations, signal bearing medium 902 may encompass a computer-readable medium 906, such as, but not limited to, a hard disk drive, a Compact Disc (CD), a Digital Video Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, program product 900 may be conveyed to one or more modules of holographic television apparatus 110 or 600 by an RF signal bearing medium 902, where signal bearing medium 902 is conveyed by a wireless communications medium 910 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A holographic imaging device, comprising:
a light irradiation unit configured to transmit a photo-inducing light; and
a transparent substrate having a particular refractive index, the transparent substrate including a first surface and a second surface opposite the first surface, wherein the first surface is configured to receive an incident light, and wherein the second surface is configured to receive the photo-inducing light, and
wherein the light irradiation unit and the transparent substrate are collaboratively configured to selectively form at least one interference fringe pattern from a photo-induced change in the refractive index of the transparent substrate responsive to the photo-inducing light.

2. The holographic imaging device of claim 1, wherein the light irradiation unit includes at least one laser beam source.

3. The holographic imaging device of claim 2, wherein the at least one laser beam source is configured to irradiate the second surface of the transparent substrate with two laser beams that cross with each other at a particular location in the transparent substrate effective to cause the photo-induced change in the refractive index of the transparent substrate.

4. The holographic imaging device of claim 1, further comprising:
an erasing light irradiation unit configured to irradiate the second surface of the transparent substrate with an erasing light effective to remove the formed at least one interference fringe pattern.

5. The holographic imaging device of claim 1, further comprising:
a controller configured to control the light irradiation unit and configured to determine at least one of an angle, an intensity, and a position of the formed at least one interference fringe pattern.

6. The holographic imaging device of claim 5, wherein the second surface of the transparent substrate is interposed between the controller and the first surface of the transparent substrate.

7. The holographic imaging device of claim 5, wherein the controller is configured to control the light irradiation unit effective to transmit the photo-inducing light towards regions of the transparent substrate that are spaced apart at particular spatial intervals.

8. The holographic imaging device of claim 1, wherein the transparent substrate is formed in a substantially flat plate shape having a thickness of an order of 10 μm.

9. The holographic imaging device of claim 1, wherein the transparent substrate is made of transparent ferroelectric material.

10. The holographic imaging device of claim 9, wherein the transparent ferroelectric material includes one or more materials selected from a group consisting of $LiNbO_3$, $BaTiO_3$, KDP (Kalium Dihydrogen Phosphate), and ZnO.

11. A holographic television apparatus, comprising:
a plurality of holographic imaging devices arranged in a two-dimensional matrix form, each holographic imaging device including:
a light irradiation unit configured to transmit a photo-inducing light; and
a transparent substrate having a particular refractive index, the transparent substrate including a first surface and a second surface opposite the first surface, wherein the first surface is configured to receive an incident light, and wherein the second surface is configured to receive the photo-inducing light, and
wherein the light irradiation unit and the transparent substrate are collaboratively configured to selectively form at least one interference fringe pattern from a photo-induced change in the refractive index of the transparent substrate responsive to the photo-inducing light.

12. The holographic television apparatus of claim 11, wherein the light irradiation unit includes at least one laser beam source.

13. The holographic television apparatus of claim 12, wherein the at least one laser beam source is configured to irradiate the second surface of the transparent substrate with two laser beams that cross with each other at a particular location in the transparent substrate effective to cause the photo-induced change in the refractive index of the transparent substrate.

14. The holographic television apparatus of claim 11, wherein each of the holographic imaging devices further includes an erasing light irradiation unit configured to irradiate the second surface of the transparent substrate with an erasing light effective to remove the formed at least one interference fringe pattern.

15. The holographic television apparatus of claim 11, further comprising a controller configured to control the light irradiation unit of each holographic imaging device and configured to determine at least one of an angle, intensity, and a position of the formed at least one interference fringe pattern.

16. The holographic television apparatus of claim 15, wherein the controller is configured to control the light irradiation unit effective to transmit the photo-inducing light towards regions of the transparent substrate that are spaced apart at particular spatial intervals.

17. The holographic television apparatus of claim 15, further comprising a receiver unit configured to receive a control signal from an external source and configured to provide the control signal to the controller.

18. The holographic television apparatus of claim 11, wherein the transparent substrate is made of transparent ferroelectric material.

19. The holographic television apparatus of claim 18, wherein the transparent ferroelectric material includes one or more materials selected from a group consisting of $LiNbO_3$, $BaTiO_3$, KDP, and ZnO.

20. A method to generate an image in a holographic imaging device including a transparent substrate having a particular refractive index, the transparent substrate including a first surface configured to receive an incident light and a second surface opposite the first surface, the method comprising:
generating, by a light irradiation unit, a photo-inducing light; and
irradiating, by the light irradiation unit, the second surface of the transparent substrate with the photo-inducing light to form at least one interference fringe pattern, by causing a photo-induced change in the refractive index of the transparent substrate.

21. The method of claim 20, wherein the irradiating includes:
irradiating, by the light irradiation unit, the second surface of the transparent substrate with two laser beams that cross with each other at a particular location in the transparent substrate effective to cause the photo-induced change in the refractive index of the transparent substrate.

22. The method of claim 20, further comprising:
irradiating, by an erasing light irradiation unit, the second surface of the transparent substrate with an erasing light effective to remove the formed at least one interference fringe pattern.

23. The method of claim 20, further comprising:
controlling, by a controller, the light irradiation unit effective to determine at least one of an angle and a position of the formed at least one interference fringe pattern.

24. The method of claim 23, wherein the controlling includes:
controlling, by the controller, the light irradiation unit to transmit the photo-inducing light towards regions spaced apart at particular spatial intervals in the transparent substrate.

25. The method of claim 20, wherein the irradiating the second surface of the transparent substrate includes irradiating a transparent substrate that is made of transparent ferroelectric material.

26. The method of claim 25, wherein the irradiating the transparent substrate that is made of transparent ferroelectric material includes irradiating a transparent ferroelectric material that includes one or more materials selected from a group consisting of $LiNbO_3$, $BaTiO_3$, KDP, and ZnO.

* * * * *

UNITED STATES PATENT AND TRADEMARK OFFICE
CERTIFICATE OF CORRECTION

PATENT NO.          : 9,025,005 B2                                  Page 1 of 1
APPLICATION NO.     : 13/989792
DATED               : May 5, 2015
INVENTOR(S)         : Yamaichi It is certified that error appears in the above-identified patent and that said Letters Patent is hereby corrected as shown below:

On the Title Page, in Item (74), under "Primary Examiner", in Column 2, Line 1, delete "Dave Czeka" and insert -- Dave Czekaj --, therefor.

In the Specification

In Column 1, Line 7, delete "§371" and insert -- § 371 --, therefor.

In Column 1, Line 26, delete "diffraction limit" and insert -- diffraction limit. --, therefor.

In Column 6, Line 32, delete "change in" and insert -- change Δn in --, therefor.

Signed and Sealed this
Seventeenth Day of November, 2015

Michelle K. Lee
*Director of the United States Patent and Trademark Office*